(12) United States Patent
Buchar

(10) Patent No.: US 9,418,534 B2
(45) Date of Patent: Aug. 16, 2016

(54) WATER HEATER PRESSURE RELIEF VALVE ALARM

(71) Applicant: Zdenek Buchar, Chattanooga, TN (US)

(72) Inventor: Zdenek Buchar, Chattanooga, TN (US)

( * ) Notice: Subject to any disclaimer, the term of this patent is extended or adjusted under 35 U.S.C. 154(b) by 8 days.

(21) Appl. No.: 14/463,246

(22) Filed: Aug. 19, 2014

(65) Prior Publication Data

US 2016/0055734 A1 Feb. 25, 2016

(51) Int. Cl.
*G08B 21/00* (2006.01)
*G08B 21/18* (2006.01)

(52) U.S. Cl.
CPC .................... *G08B 21/182* (2013.01)

(58) Field of Classification Search
CPC .... G08B 19/00; G08B 21/18; Y10T 13/5762; Y10T 137/8326
USPC .................. 340/636, 605, 531, 611, 614, 626
See application file for complete search history.

(56) References Cited

U.S. PATENT DOCUMENTS

| 5,315,291 | A | * | 5/1994 | Furr | ...... | G01M 3/16 200/61.05 |
| 8,643,497 | B2 | * | 2/2014 | Murphy | ...... | G01M 3/3245 137/312 |
| 2008/0309503 | A1 | * | 12/2008 | White | ...... | G01M 3/26 340/606 |
| 2011/0283958 | A1 | * | 11/2011 | Lesage | ...... | F22B 37/42 122/504.2 |
| 2012/0275927 | A1 | * | 11/2012 | Rhim | ...... | F04B 23/02 417/36 |

* cited by examiner

*Primary Examiner* — Phung Nguyen

(57) ABSTRACT

A water heater pressure relief valve alarm monitors the state of a discharge pipe of a water heater and produces an audible alarm upon detection of water being discharged through the pipe. A clamp with a pipe receiving aperture is removably attached to the pipe. A sensor is positioned adjacent to the pipe receiving aperture. A housing connected to the clamp contains a signal processing circuit, a sound producing device and a battery. The signal processing circuit receives a signal from the sensor and activates the sound producing device upon detection of discharge from the pipe.

12 Claims, 5 Drawing Sheets

WATER HEATER PRESSURE RELIEF VALVE ALARM

FIELD OF THE INVENTION

The present invention relates generally to monitoring devices. More particularly, the present invention relates to monitoring the state of a water heater.

BACKGROUND OF THE INVENTION

Water heating is a thermodynamic process that uses an energy source to heat water above its initial temperature. Typical domestic uses of hit water include cooking, cleaning, bathing, and space heating. Many homes use appliances that provide a continual supply of hot water known as water heaters, hot water tanks, or boilers, depending on region and application. Water heaters may use various energy sources for heating water, such as fossil fuels, solid fuels, electricity, solar energy, heat pumps, hot water heat recycling, or geothermal heating.

In household and commercial usage, most North American water heaters have traditionally been the tank type, also known as storage water heaters, consisting of a cylindrical container that keeps water continually hot and ready to use. It is common for water heater systems to utilize pressurized systems in order to achieve efficiency of operation. Pressurized components can potentially explode and cause significant damage, injury or death if the certain safety devices are not installed or if certain components fail. A safety device called a temperature and pressure relief (T&P or TPR) valve is normally fitter to the top of the water heater to expel water if the temperature or pressure within the water heater becomes too high. Typically, a discharge pipe is connected to the TPR valve to direct the flow of discharged water to a drain, typically a nearby floor drain, or outside the living space.

Water damage can be very disastrous for a household. Not only do the physical portions of the house such as walls, woodwork, drywall, carpeting, and the like get ruined, but personal belongings such as furniture, appliances, and the like get destroyed as well. While water damage due to rain or flooded rivers is beyond control in most cases, a great deal of damage can occur from water heaters should the TPR valve actuate either due to operating problems or a faulty valve. The piping leading from water heaters simply splashes on the nearby floor with hopes that it makes it to a drain. Unfortunately, many releases go unnoticed for long periods of time, and can result in thousands of dollars of damage. Accordingly, there exists a need for a means by which users can be instantly alerted to water releases from hot water tank relief valves in an effort to address the problem as described above. Altering the occupants of the household to a discharge of water from the water heater may result in mitigation of water damage. A related problem can occur if the TPR valve does not completely fail, but simply has a leak. This does not create such an immediate issue as with a full TPR valve activation or failure, but over time can still be expensive due to the unnecessary loss of water and electric energy if left unnoticed.

It is therefore the object of the present invention to provide a water heater pressure relief valve alarm which sounds an audible alarm upon detecting activation of the TPR valve, and which is easily installed and removed.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a device which monitors the state of a discharge pipe of a water heater in order to detect whether the temperature and pressure relief valve (TPR valve) has been actuated or has failed, resulting in water being expelled through the discharge pipe. Upon detection of water discharge, an audible alarm is produced in order to alert persons in the surrounding area to the discharge. Left undealt with, water may accumulate in the area and lead to water damage of portions of the structure containing the water heater, belongings or other items in the area, or other undesirable damage.

Figure 1:
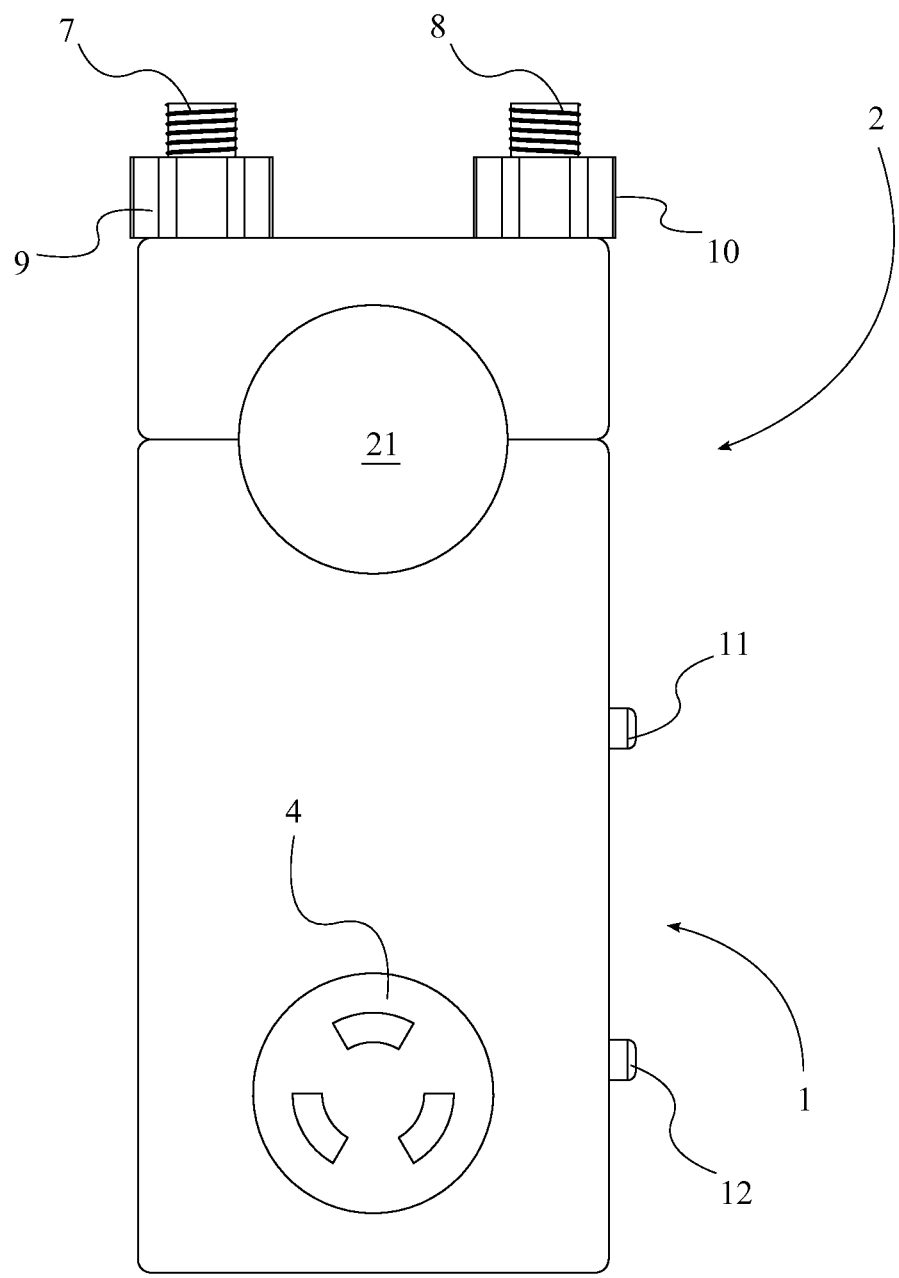
FIG. 1 is a front view of the present invention.
Figure 2:
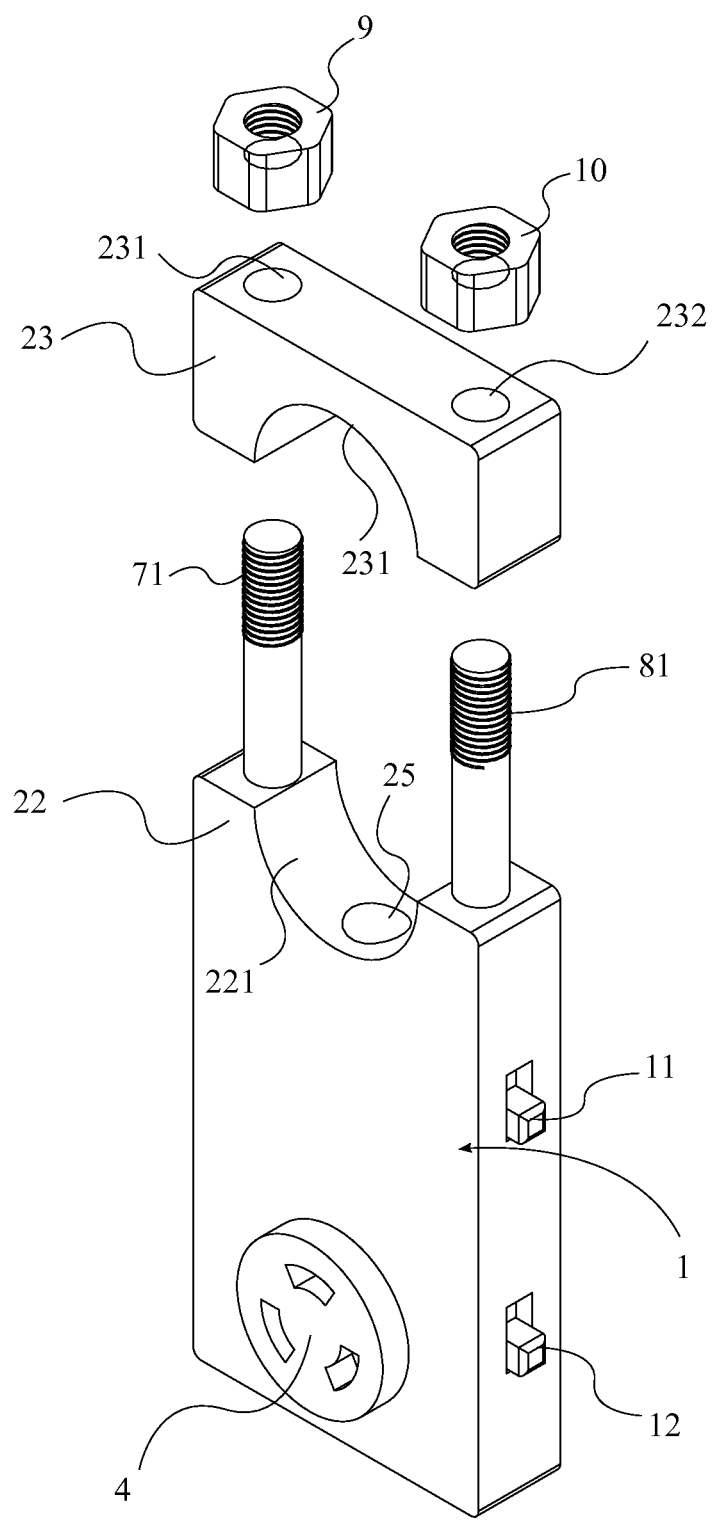
FIG. 2 is a perspective exploded view of the present invention.
Figure 3:
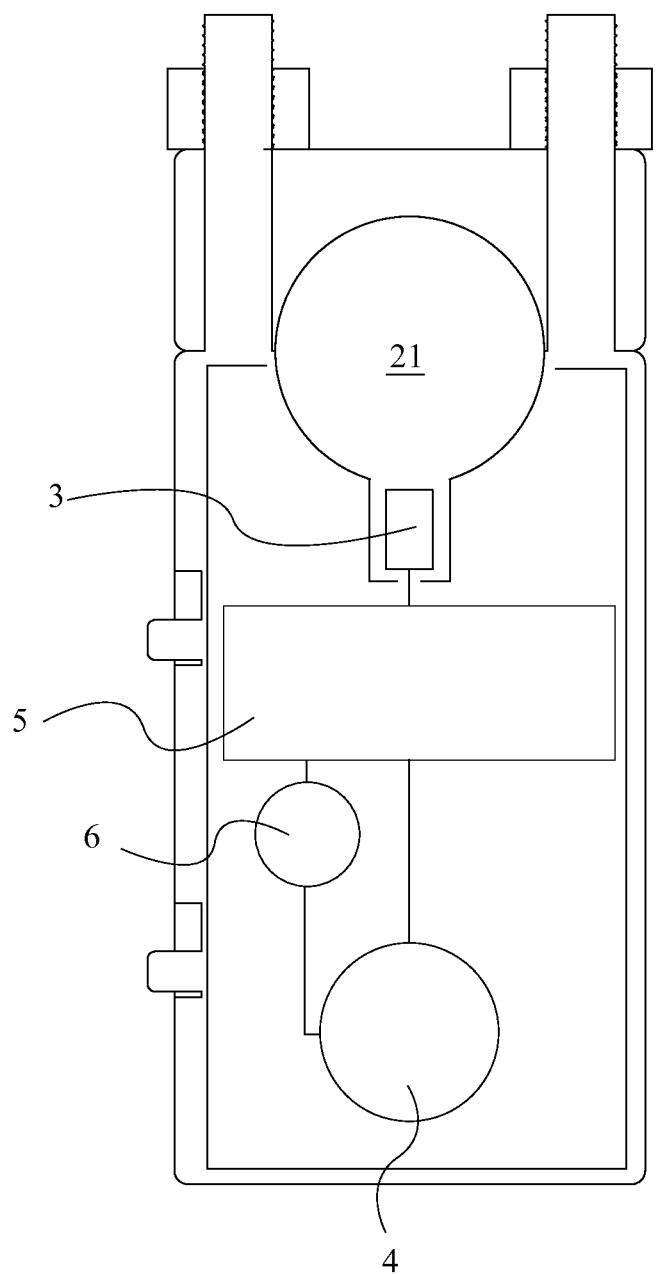
FIG. 3 is a front cross-sectional view of the present invention.

Referring to FIGS. 1-3, the present invention generally comprises a housing 1, a clamp 2, a sensor 3, a sound producing device 4, a signal processing circuit 5, and a power source 6. The housing 1 is a rigid enclosure which contains the majority of the electronic components of the present invention. The housing 1 is preferably injection molded from a plastic material, though the housing 1 may be made by any desired manufacturing process or material. In the preferred embodiment of the present invention, the power source 6 is a battery and is positioned within the housing 1. The battery may be removable, rechargeable, and/or disposable. In an alternate embodiment, the power source 6 may be a typical electrical cord which can be plugged into a typical electrical wall outlet.

The clamp 2 facilitates attachment of the present invention to the discharge pipe. The clamp 2 is connected adjacent to the housing 1 and comprises a pipe receiving aperture 21. The clamp 2 is able to open in order to receive the discharge pipe within the pipe receiving aperture 21, and then close around the pipe and be fastened in the closed position. In the preferred embodiment of the present invention, the clamp 2 comprises a body portion 22 and a clamping portion 23. The body portion 22 is connected adjacent to the housing 1, and the clamping portion 23 is positioned adjacent to the body portion 22 opposite the housing 1. As shown in FIG. 2, in the preferred embodiment, the body portion 22 and the clamping portion 23 are removably attached to each other. In an alternate embodiment, the body portion 22 and the clamping portion 23 are connected to each other by a hinge 24. The body portion 22 comprises a first semicircular cutout, and the clamping portion 23 comprises a second semicircular cutout. When the clamping portion 23 is attached to the body portion 22, the first semicircular cutout and the second semicircular cutout form the pipe receiving aperture 21.

In the preferred embodiment of the present invention, the body portion 22 and the clamping portion 23 are removably attached to each other by a first fastener 7 and a second fastener 8. The first fastener 7 and the second fastener 8 may be any of a variety of fasteners that facilitate the clamping portion 23 being removably attached to the body portion 22, but in the preferred embodiment, the first fastener 7 is a first threaded bolt 71 and the second fastener 8 is a second threaded bolt 81. The first threaded bolt 71 and the second threaded bolt 81 are connected to the body portion 22 opposite the housing 1. The first threaded bolt 71 and the second threaded bolt 81 are oriented parallel to each other, and are positioned opposite each other on the body portion 22 across the pipe receiving aperture 21, or more specifically across the first semicircular cutout.

The clamping portion 23 comprises a first bolt hole 231 and a second bolt hole 232. The first bolt hole 231 and the second bolt hole 232 traverse through the clamping portion 23 perpendicular to the second semicircular cutout. The first bolt hole 231 and the second bolt hole 232 are oriented parallel to each other, and are positioned opposite each other on the clamping portion 23 across the pipe receiving aperture 21, or more specifically across the second semicircular cutout. In order to attach the clamping portion 23 to the body portion 22, the first threaded bolt 71 hole is positioned through the first bolt hole 231 and the second threaded bolt 81 is positioned through the second bolt hole 232. The first threaded bolt 71 and the second threaded bolt 81 are longer than the first bolt hole 231 and the second bolt hole 232, so that a portion of the first threaded bolt 71 and the second threaded bolt 81 protrude from the first bolt hole 231 and the second bolt hole 232. A first threaded nut 9 is threadedly attached to the first threaded bolt 71 adjacent to the clamping portion 23 opposite the body portion 22, and a second threaded nut 10 is threadedly attached to the second threaded bolt 81 adjacent to the clamping portion 23 opposite the body portion 22. In order to install the present invention, the discharge pipe should have been enveloped by the pipe receiving aperture 21 before the clamping portion 23 is attached to the body portion 22.

As shown in FIG. 3, the sensor 3 is positioned adjacent to the pipe receiving aperture 21, preferably within a sensor chamber 25 positioned within the body portion 22 of the clamp 2. In one embodiment, the sensor chamber 25 intersects with the pipe receiving aperture 21 so that the sensor 3 is not separated from the pipe by any material. In another embodiment, the sensor chamber 25 does not intersect with the pipe receiving aperture 21. The sensor 3 in this embodiment does not need to be immediately adjacent to the pipe.

The sensor 3 may belong to one of a variety of sensor 3 types. Preferably, the sensor 3 is selected from a group consisting of: a temperature sensor, a sound sensor, an electrical conductivity sensor, a pressure sensor, a vibration sensor, an electrostatic field sensor, an infrared sensor and a magnetic field sensor. Any sensor which facilitates detecting water discharge through the discharge pipe may be utilized.

The sound producing device 4 is positioned on the housing 1, or traversing through the housing 1. The sound producing device 4 should not be obstructed in order to ensure a clear alert can be sounded. In the preferred embodiment, the sound producing device 4 is a piezo buzzer. However, the sound producing device 4 may alternatively be any other device which can produce sound, such as a speaker. The sound producing device 4 is electrically connected to the power source 6.

The signal processing circuit 5 is positioned within the housing 1. The sensor 3 is electronically connected to the sound producing device 4 by the signal processing circuit 5, wherein the signal processing circuit 5 activates the sound producing device 4 if an anomaly signal is received from the sensor 3. The anomaly signal is any signal from the sensor 3 that indicates a discharge of water through the discharge pipe.

Figure 4:
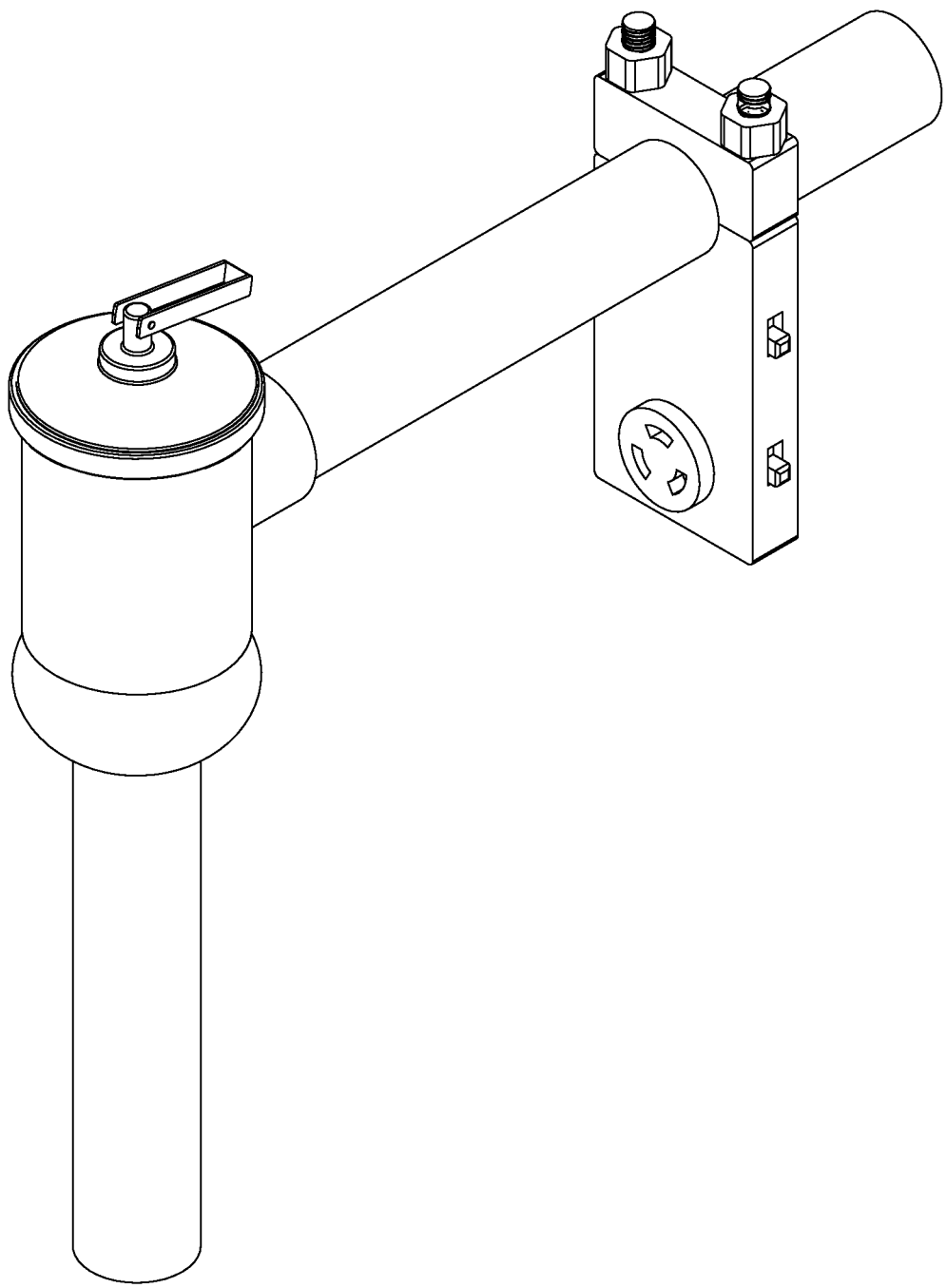
FIG. 4 is a perspective view of the present invention installed on a pipe.
Figure 5:
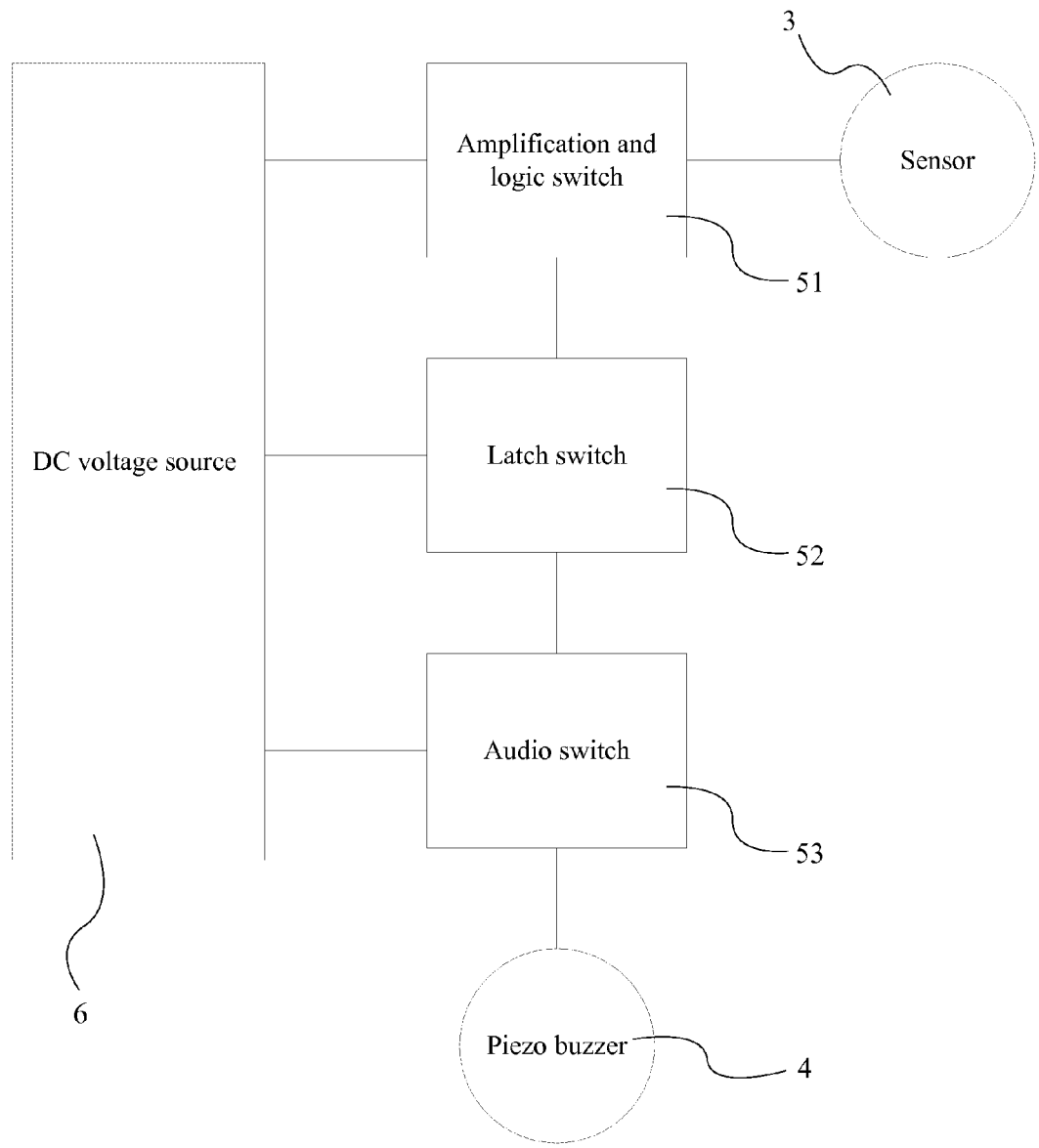
FIG. 5 is a block diagram for the main electronic components of the present invention.

As shown in FIG. 4, in the preferred embodiment of the present invention, the signal processing circuit 5 comprises an amplification and logic switch 51, a latch switch 52, and an audio switch 53. The power source 6 is electronically connected to the amplification and logic switch 51, the latch switch 52, and the audio switch 53. The amplification and logic switch 51 is electronically connected to the sensor 3 and the latch switch 52. The audio switch 53 is electronically connected to the latch switch 52 and the sound producing device 4. The amplification and logic switch 51 and the latch switch 52 may be embodied through analog devices, such as operational amplifiers and logic gates, and/or microprocessors.

In alternate embodiments, the signal processing circuit 5 may include any other electronics or circuitry which facilitates activating the sound producing device 4 when the sensor 3 detects that water is being discharged through the discharge pipe.

The preferred embodiment of the present invention also comprises a test switch 11 and a reset switch 12. The test switch 11 allows a user to ascertain whether the present invention is functional. Activating the test switch 11 temporarily activates the sound producing device 4. The reset switch 12 enables the user to disable the sound producing device 4 is the sound producing device 4 is activated due to the sensor 3 detecting a discharge of water through the discharge pipe. The test switch 11 and the reset switch 12 are electronically connected to the signal processing circuit 5. Preferably, the test switch 11 and the reset switch 12 traverse through the housing 1 or are positioned on the housing 1. The test switch 11 and the reset switch 12 may be any type of switch, such as a sliding switch, a rotary switch, or a toggle switch, or a button, or an electronic display may provide the functionality for the test switch 11 and the reset switch 12 through a touchscreen display.

Although the invention has been explained in relation to its preferred embodiment, it is to be understood that many other possible modifications and variations can be made without departing from the spirit and scope of the invention as hereinafter claimed.

What is claimed is:
1. A water heater pressure relief valve alarm comprises:
a housing;
a clamp;
a sensor;
a sound producing device;
a signal processing circuit;
a power source;
the clamp comprises a pipe receiving aperture;
the clamp being connected adjacent to the housing;
the sensor being positioned adjacent to the pipe receiving aperture;
the signal processing circuit being positioned within the housing;
the sound producing device being positioned on the housing;
the sound producing device and the signal processing circuit being electrically connected to the power source;
the sensor being electronically connected to the sound producing device by the signal processing circuit, wherein the signal processing circuit activates the sound producing device if an anomaly signal is received from the sensor;
the clamp comprises a body portion and a clamping portion;
the body portion being connected adjacent to the housing;
the clamping portion being positioned adjacent to the body portion opposite the housing;

the body portion and the clamping portion being removably attached to each other;
a first threaded bolt and a second threaded bolt;
the clamping portion comprises a first bolt hole and a second bolt hole;
the first threaded bolt and the second threaded bolt being connected to the body portion opposite the housing;
the first threaded bolt and the second threaded bolt being oriented parallel to each other;
the first threaded bolt and the second threaded bolt being positioned opposite each other on the body portion across the pipe receiving aperture;
the first bolt hole and the second bolt hole being oriented parallel to each other;
the first bolt hole and the second bolt hole being positioned opposite each other on the clamping portion across the pipe receiving aperture;
the first threaded bolt being removably positioned through the first bolt hole;
the second threaded bolt being removably positioned through the second bolt hole;
a first threaded nut being threadedly attached to the first threaded bolt adjacent to the clamping portion opposite the body portion;
a second threaded nut being threadedly attached to the second threaded bolt adjacent to the clamping portion opposite the body portion;
the signal processing circuit comprises an amplification and logic switch, a latch switch, and an audio switch;
the power source being electrically connected to the amplification and logic switch, the latch switch, and the audio switch;
the amplification and logic switch being electrically connected to the sensor and the latch switch; and
the audio switch being electrically connected to the latch switch and the sound producing device.

2. The water heater pressure relief valve alarm as claimed in claim 1 comprises:
the body portion and the clamping portion being removably attached to each other by a first fastener and a second fastener.

3. The water heater pressure relief valve alarm as claimed in claim 2 comprises:
the first fastener being a first threaded bolt; and
the second fastener being a second threaded bolt.

4. The water heater pressure relief valve alarm as claimed in claim 1 comprises:
the body portion and the clamping portion being connected to each other by a hinge.

5. The water heater pressure relief valve alarm as claimed in claim 1 comprises:
the sensor being positioned adjacent to the pipe receiving aperture.

6. The water heater pressure relief valve alarm as claimed in claim 1 comprises:
the power source being a battery; and
the battery being positioned within the housing.

7. The water heater pressure relief valve alarm as claimed in claim 1 comprises:
the power source being electrically connected to the sensor.

8. The water heater pressure relief valve alarm as claimed in claim 1 comprises:
the clamp comprises a sensor chamber; and
the sensor chamber being positioned within the clamp adjacent to the pipe receiving aperture.

9. The water heater pressure relief valve alarm as claimed in claim 8 comprises:
the sensor chamber intersecting with the pipe receiving aperture.

10. The water heater pressure relief valve alarm as claimed in claim 1 comprises:
the sensor being selected from a group consisting of a temperature sensor, a sound sensor, an electrical conductivity sensor, a pressure sensor, a vibration sensor, an electrostatic field sensor, an infrared sensor and a magnetic field sensor.

11. The water heater pressure relief valve alarm as claimed in claim 1 comprises:
a test switch; and
the test switch being electronically connected to the signal processing circuit, wherein the test switch activates the sound producing device.

12. The water heater pressure relief valve alarm as claimed in claim 1 comprises:
a reset switch; and
the reset switch being electronically connected to the signal processing circuit, wherein the reset switch disables the sound producing device if the sound producing device is activated.

* * * * *